United States Patent [19]
Kim

[11] Patent Number: 5,619,336
[45] Date of Patent: Apr. 8, 1997

[54] RECORDING APPARATUS AND METHOD FOR VIDEO CASSETTE RECORDER HAVING SNOW NOISE REMOVING FUNCTION

[75] Inventor: Ye T. Kim, Kyungki-Do, Rep. of Korea

[73] Assignee: Goldstar Electron Co., Ltd., Cheongju, Rep. of Korea

[21] Appl. No.: 353,282

[22] Filed: Dec. 5, 1994

[30] Foreign Application Priority Data

Dec. 4, 1993 [KR] Rep. of Korea .................. 26421/1993

[51] Int. Cl.$^6$ ........................................... H04N 5/76
[52] U.S. Cl. ............................................. 386/114; 360/71
[58] Field of Search ................................... 358/335, 310, 358/342; 360/33.1, 69, 71; H04N 5/76, 5/92

[56] References Cited

U.S. PATENT DOCUMENTS

| | | | |
|---|---|---|---|
| 4,161,002 | 7/1979 | Saito | 360/75 |
| 4,314,285 | 2/1982 | Bonner et al. | 360/33.1 |
| 4,782,401 | 11/1988 | Faerber et al. | 358/335 |
| 4,982,305 | 1/1991 | Asano et al. | 360/69 |

Primary Examiner—Thai Q. Tran
Attorney, Agent, or Firm—Fleshner & Kim

[57] ABSTRACT

Recording apparatus and method for a video cassette recorder having a snow noise removing function. The recording apparatus comprises a tuner for tuning a television broadcasting signal received through an antenna to a channel desired by the user, a signal processor for separating a vertical synchronous signal, a video signal and an audio signal from the television broadcasting signal tuned by the tuner, a vertical synchronous signal counting circuit for counting the number of pulses of the vertical synchronous signal from the signal processor, a system controller for discriminating a received state of the television broadcasting signal in response to the vertical synchronous signal from the signal processor and a plurality of output signals from the vertical synchronous signal counting circuit and determining an operating mode of the video cassette recorder in accordance with the discriminated result, and a servo controller for controlling a head drum and a capstan under control of the system controller to record the video and audio signals from the signal processor on a magnetic tape. According to the invention, if the reception of the television broadcasting signal is broken off in a recording operation, a broken-off signal portion is not recorded and only a normal signal portion is selectively recorded.

11 Claims, 4 Drawing Sheets

RECORDING APPARATUS AND METHOD FOR VIDEO CASSETTE RECORDER HAVING SNOW NOISE REMOVING FUNCTION

BACKGROUND OF THE INVENTION

1. Field of the Invention

The present invention relates in general to recording apparatus and method for a video cassette recorder, and more particularly to recording apparatus and method for a video cassette recorder having a snow noise removing function in which an operating mode of the video cassette recorder is switched to a recording pause mode when reception of a television broadcasting signal is broken off in a recording operation, so that a snow noise cannot be recorded on a magnetic tape.

2. Description of the Prior Art

Referring to FIG. 1, there is shown a block diagram of a conventional recording apparatus for a video cassette recorder (referred to hereinafter as VCR). As shown in this drawing, the conventional recording apparatus for the VCR comprises a tuner 1 for tuning a television (referred to hereinafter as TV) broadcasting signal received through an antenna ANT to a channel desired by the user, a signal processor 2 for separating a vertical synchronous signal, a video signal and an audio signal from the TV broadcasting signal tuned by the tuner 1, a system controller 4 for performing a control operation in response to the vertical synchronous signal from the signal processor 2 to record the video and audio signals from the signal processor 2 on a magnetic tape T, and a servo controller 5 for controlling a head drum 6 and a capstan 7 under the control of the system controller 4. The head drum 6 is driven under the control of the servo controller 5 to record the video and audio signals from the signal processor 2 on the magnetic tape T. The capstan 7 is driven under the control of the servo controller 5 to transport the magnetic tape T.

The operation of the conventional recording apparatus for the VCR with the above-mentioned construction will hereinafter be described.

When the user selects a desired channel to record a desired TV broadcasting signal on the magnetic tape T, the tuner 1 tunes the TV broadcasting signal received through the antenna ANT to the selected channel and outputs the tuned TV broadcasting signal to the signal processor 2. The signal processor 2 separates the vertical synchronous signal, the video signal and the audio signal from the TV broadcasting signal tuned by the tuner 1 and outputs the separated vertical synchronous signal to the system controller 4. The video and audio signals from the signal processor 2 are transferred to the head drum 6. The system controller 4 controls the servo controller 5 in response to the vertical synchronous signal from the signal processor 2. As being controlled by the system controller 4, the servo controller 5 controls the operations of the head rum 6 and the capstan 7. As a result, under the control of the servo controller 5, the head rum 6 records the video and audio signals from the signal processor 2 on the magnetic tape T being transported by the capstan 7.

However, the above-mentioned conventional recording apparatus for the VCR has a disadvantage in that a snow noise is generated as the reception of the TV broadcasting signal is broken off in a recording operation, and then directly recorded on the magnetic tape.

SUMMARY OF THE INVENTION

Therefore, the present invention has been made in view of the above problem, and it is an object of the present invention to provide recording apparatus and method for a VCR having a snow noise removing function in which an operating mode of the VCR is switched to a recording pause mode when a snow noise is generated as reception of a TV broadcasting signal is broken off in a recording operation, so that the snow noise cannot be recorded on a magnetic tape and only a normal portion of the TV broadcasting signal can selectively be recorded on the magnetic tape.

In accordance with one aspect of the present invention, there is provided a recording apparatus for a video cassette recorder having a snow noise removing function, comprising tuning means for tuning a television broadcasting signal received through an antenna to a channel desired by the user; signal processing means for separating a vertical synchronous signal, a video signal and an audio signal from the television broadcasting signal tuned by said tuning means; vertical synchronous signal counting means for counting the number of pulses of the vertical synchronous signal from said signal processing means; system control means for discriminating a received state of the television broadcasting signal in response to the vertical synchronous signal from said signal processing means and a plurality of output signals from said vertical synchronous signal counting means and determining an operating mode of the video cassette recorder in accordance with the discriminated result; and servo control means for controlling a head drum and a capstan under control of said system control means to record the video and audio signals from said signal processing means on a magnetic tape.

In accordance with another aspect of the present invention, there is provided a recording method for a video cassette recorder having a snow noise removing function, comprising the steps of checking whether pulses of a vertical synchronous signal are omitted by a predetermined number in recording of a television broadcasting signal, advancing a recording operation if it is checked that the pulses of the vertical synchronous signal are not omitted by the predetermined number in the recording of the television broadcasting signal and setting an operating mode of the video cassette recorder to a recording pause mode if it is checked that the pulses of the vertical synchronous signal are omitted by the predetermined number in the recording of the television broadcasting signal; and checking whether the vertical synchronous signal is again received within a predetermined time period, releasing said recording pause mode to advance the recording operation again if it is checked that the vertical synchronous signal is again received within the predetermined time period and setting the operating mode of the video cassette recorder to a recording stop mode if it is checked that the vertical synchronous signal is not received again within the predetermined time period.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
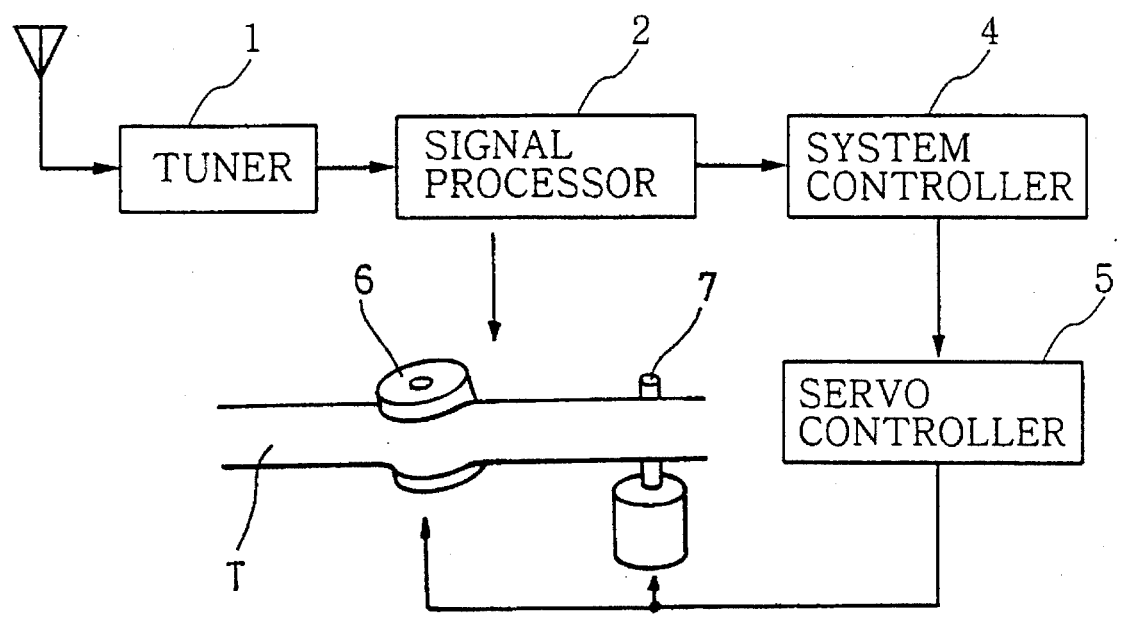
FIG. 1 is a block diagram of a conventional recording apparatus for a VCR.
Figure 2:
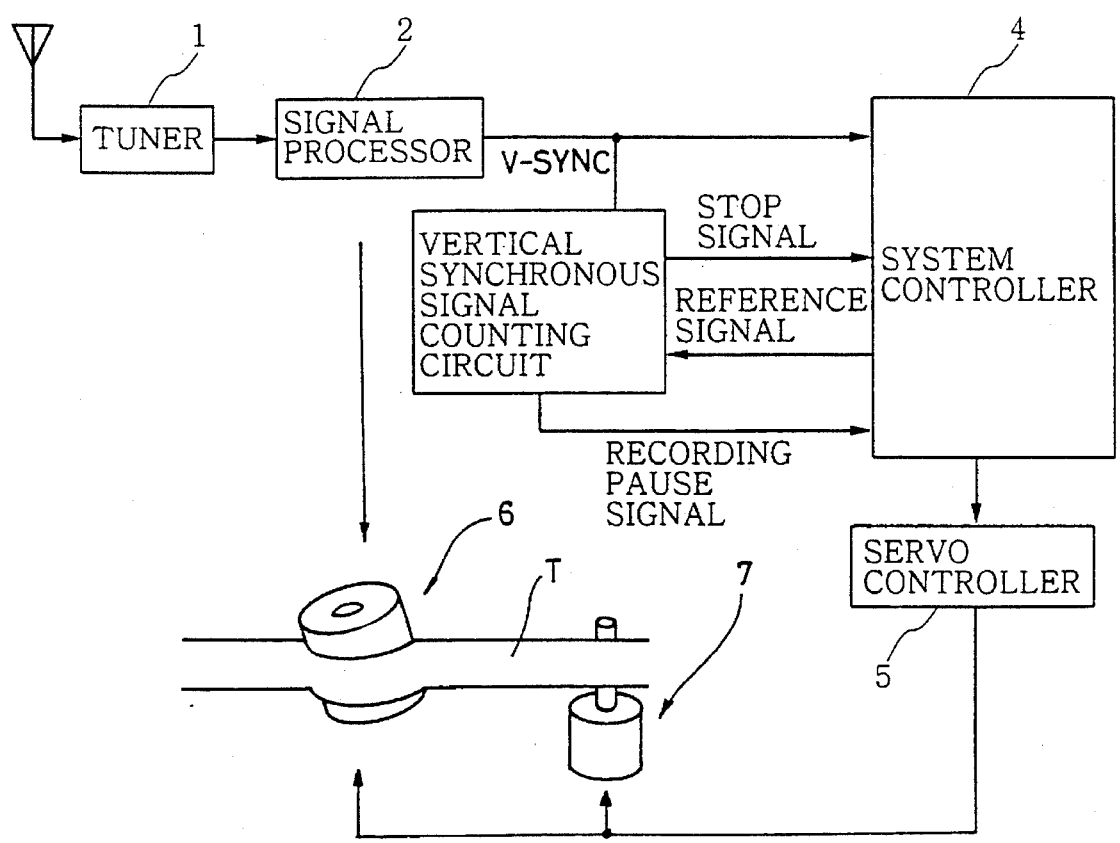
FIG. 2 is a block diagram of a recording apparatus for a VCR having a snow noise removing function in accordance with the present invention.

Referring to FIG. 2, there is shown a block diagram of a recording apparatus for a VCR having a snow noise removing function in accordance with the present invention. Some of parts in this drawing are the same as those in FIG. 1. Therefore, like reference numerals designate like parts.

In FIG. 1, the recording apparatus for the VCR comprises the tuner 1 for tuning a TV broadcasting signal received through the antenna ANT to a channel desired by the user. The signal processor 2 is adapted to separate the vertical synchronous signal, the video signal and the audio signal from the TV broadcasting signal tuned by the tuner 1.

The recording apparatus for the VCR also comprises a vertical synchronous signal counting circuit 3 for counting the number of pulses of the vertical synchronous signal from the signal processor 2. The system controller 4 is adapted to discriminate a received state of the TV broadcasting signal in response to the vertical synchronous signal from the signal processor 2 and a plurality of output signals from the vertical synchronous signal counting circuit 3 and determine an operating mode of the VCR in accordance with the discriminated result. The servo controller 5 is adapted to control the head drum 6 and the capstan 7 under the control of the system controller 4 to record the video and audio signals from the signal processor 2 on the magnetic tape T. The head drum 6 is driven under the control of the servo controller 5 to record the video and audio signals from the signal processor 2 on the magnetic tape T. The capstan 7 is driven under the control of the servo controller 5 to transport the magnetic tape T.

Figure 3:
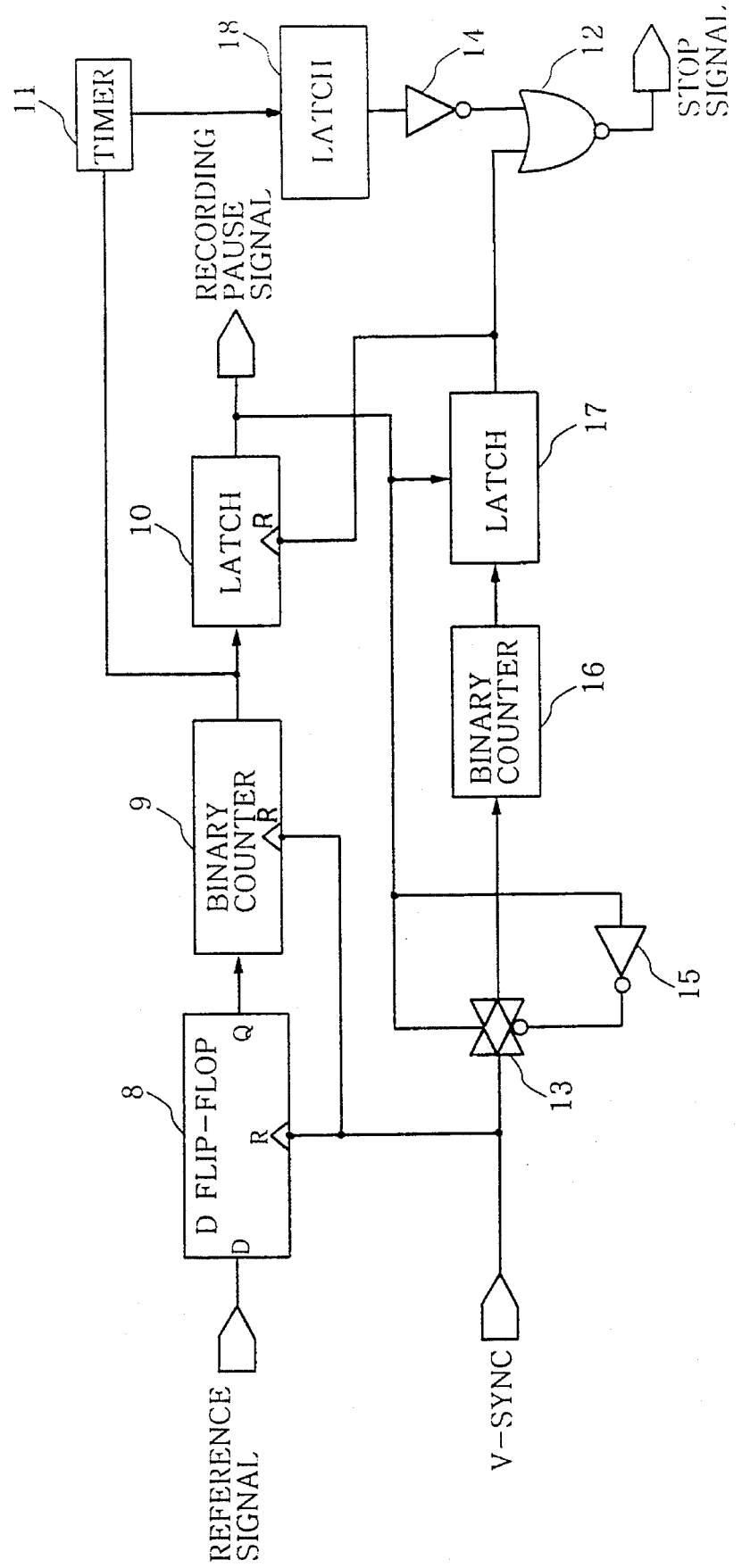
FIG. 3 is a detailed block diagram of a vertical synchronous signal counting circuit in FIG. 2.

Referring to FIG. 3, there is shown a detailed block diagram of the vertical synchronous signal counting circuit 3 in FIG. 2. As shown in this drawing, the vertical synchronous signal counting circuit 3 includes a D flip-flop 8 for inputting the vertical synchronous signal from the signal processor 2 at its reset terminal R and outputting a reference signal from the system controller 4, a binary counter 9 for inputting the vertical synchronous signal from the signal processor 2 at its reset terminal R, counting the number of pulses of the reference signal from the D flip-flop 8 and operating a timer 11 of the system controller 4 upon generation of an overflow therein, and a latch 10 for inputting an output signal from a latch 17 at its reset terminal R, latching an output signal from the binary counter 9 and outputting the latched signal as a recording pause signal to the system controller 4.

A transmission gate 13 is enabled upon inputting the recording pause signal from the latch 10 at its non-inverting input terminal and an output signal from an inverter 15 at its inverting input terminal. The inverter 15 inverts the recording pause signal from the latch 10 and outputs the inverted recording pause signal to the inverting input terminal of the transmission gate 13. As being enabled, the transmission gate 13 transmits the vertical synchronous signal from the signal processor 2 to a binary counter 16. The binary counter 16 is adapted to count the number of the pulses of the vertical synchronous signal transmitted from the transmission gate 13. The latch 17 is adapted to input the recording pause signal from the latch 10 at its reset terminal R, latch an output signal from the binary counter 16 and output the latched signal to the reset terminal R of the latch 10.

Further, the vertical synchronous signal counting circuit 3 includes a latch 18 for latching an output signal from the timer 11, an inverter 14 for inverting an output signal from the latch 18, and a NOR gate 12 for NORing the output signal from the latch 17 and an output signal from the inverter 14 and outputting the resultant signal to the system controller 4.

The operation of the recording apparatus for the VCR with the above-mentioned construction in accordance with the present invention will hereinafter be described in detail.

When the user selects a desired channel to record a desired TV broadcasting signal on the magnetic tape T, the tuner 1 tunes the TV broadcasting signal received through the antenna ANT to the selected channel and outputs the tuned TV broadcasting signal to the signal processor 2. The signal processor 2 separates the vertical synchronous signal V-SYNC, the video signal and the audio signal from the TV broadcasting signal tuned by the tuner 1 and outputs the separated vertical synchronous signal to the vertical synchronous signal counting circuit 3 and the system controller 4. The video and audio signals from the signal processor 2 are transferred to the head drum 6. The vertical synchronous signal counting circuit 3 acts to count the number of the pulses of the vertical synchronous signal from the signal processor 2. If it is discriminated as a result of the counting operation of the vertical synchronous signal counting circuit 3 that the pulses of the vertical synchronous signal are not received by a predetermined number, the system controller 4 determines that the reception of the TV broadcasting signal has been broken off. As a result, the system controller 4 controls the servo controller 5 to stop the capstan 7. With the capstan 7 stopped, the operating mode of the VCR becomes a recording pause mode. Also, the system controller 4 operates its internal timer 11 to count a time period that the vertical synchronous signal is not received.

Thereafter, in the case where the vertical synchronous signal is again detected within a predetermined time period, the system controller 4 determines that the reception broken-off state of the TV broadcasting signal has been released and then informs the servo controller 5 of the release of the recording pause mode. As a result, the servo controller 5 drives the stopped capstan 7 again so that the recording of the TV broadcasting signal can be performed again.

By the way, if the vertical synchronous signal is not detected within the predetermined time period, the system controller 4 determines that the reception of the TV broadcasting signal has completely been broken off (for example, a TV broadcasting program has been ended). As a result, the system controller 4 controls the servo controller 5 to stop the head drum 6 and the capstan 7, so that the recording operation can be stopped.

The operation of the vertical synchronous signal counting circuit 3 will hereinafter be described in more detail.

When the recording of the TV broadcasting signal is started, the system controller 4 resets the latches 10, 17 and 18 and applies the reference signal to an input terminal D of the D flip-flop 8. The vertical synchronous signal from the signal processor 2 is applied to the reset terminals R of the D flip-flop 8 and the binary counter 9. The vertical synchronous signal from the signal processor 2 has a frequency of 60 Hz and resets the D flip-flop 8 and the binary counter 9 every pulse. In this connection, no overflow is generated in the binary counter 9.

On the other hand, in the case where the vertical synchronous signal is not received due to the reception broken-off state of the TV broadcasting signal, the D flip-flop 8 and the binary counter 9 are not reset, thereby causing the D flip-flop 8 to output the reference signal of 30 Hz from the system controller 4 to the binary counter 9. Then, the binary counter 9 counts the number of the pulses of the reference signal from the D flip-flop 8. When the vertical synchronous signal is again received before the overflow is generated in the binary counter 9, the D flip-flop 8 and the binary counter 9 are again reset and the above operation is again repeated from the beginning. On the contrary, in the case where the vertical synchronous signal is not applied to the reset terminal R of the binary counter 9 as the reception broken-off state of the TV broadcasting signal continues for a considerable time period, the overflow is generated in the binary counter 9 after four pulses of the reference signal from the D flip-flop 8 are counted by the binary counter 9. The overflow signal from the binary counter 9 is applied to the timer 11 of the system controller 4 to start it. Also, the overflow signal from the binary counter 9 is applied as the recording pause signal of high logic to the system controller 4 through the latch 10.

The recording pause signal from the latch 10 is also applied to the non-inverting input terminal of the transmission gate 13. Also, the recording pause signal from the latch 10 is inverted by the inverter 15 and then applied to the inverting input terminal of the transmission gate 13. As a result, the transmission gate 13 is enabled. Also, the latch 17 is reset by the recording pause signal from the latch 10. In result, upon the presence of the vertical synchronous signal from the signal processor 2, the transmission gate 13 transmits the vertical synchronous signal to the binary counter 16, which then counts the number of the pulses of the transmitted vertical synchronous signal.

When at least four pulses of the vertical synchronous signal are received before the overflow is generated in the timer 11 counting the predetermined time period, the overflow is generated in the binary counter 16. The overflow signal from the binary counter 16 is applied to the reset terminal R of the latch 10 through the latch 17. At this time, the D flip-flop 8 and the binary counter 9 are reset by the vertical synchronous signal from the signal processor 2. As a result, the latch 10 outputs the recording pause signal of low logic to the system controller 4, thereby causing the operating mode of the VCR to become a recording continue mode. Also, the transmission gate 13 is disabled by the low output signal from the latch 10 so that the vertical synchronous signal from the signal processor 2 cannot be transmitted to the binary counter 16. Then, the D flip-flop 8 and the binary counter 9 perform repeatedly the operation of checking whether the reception of the TV broadcasting signal is broken off.

By the way, in the case where the vertical synchronous signal is not received within the predetermined time period, the overflow is generated in the timer 11 and the output signal from the latch 17 remains at its low state. The overflow signal from the timer 11 is applied to the latch 18 and then inverted into a low level by the inverter 14. The low output signal from the inverter 14 is applied to the NOR gate 12 which is also applied with the low output signal from the latch 17. As a result, the output signal from the NOR gate 12 becomes high in level. The high output signal from the NOR gate 12 is applied as a stop signal to the system controller 4. In response to the stop signal from the NOR gate 12, the system controller 4 changes the operating mode of the VCR to a recording stop mode.

Figure 4:
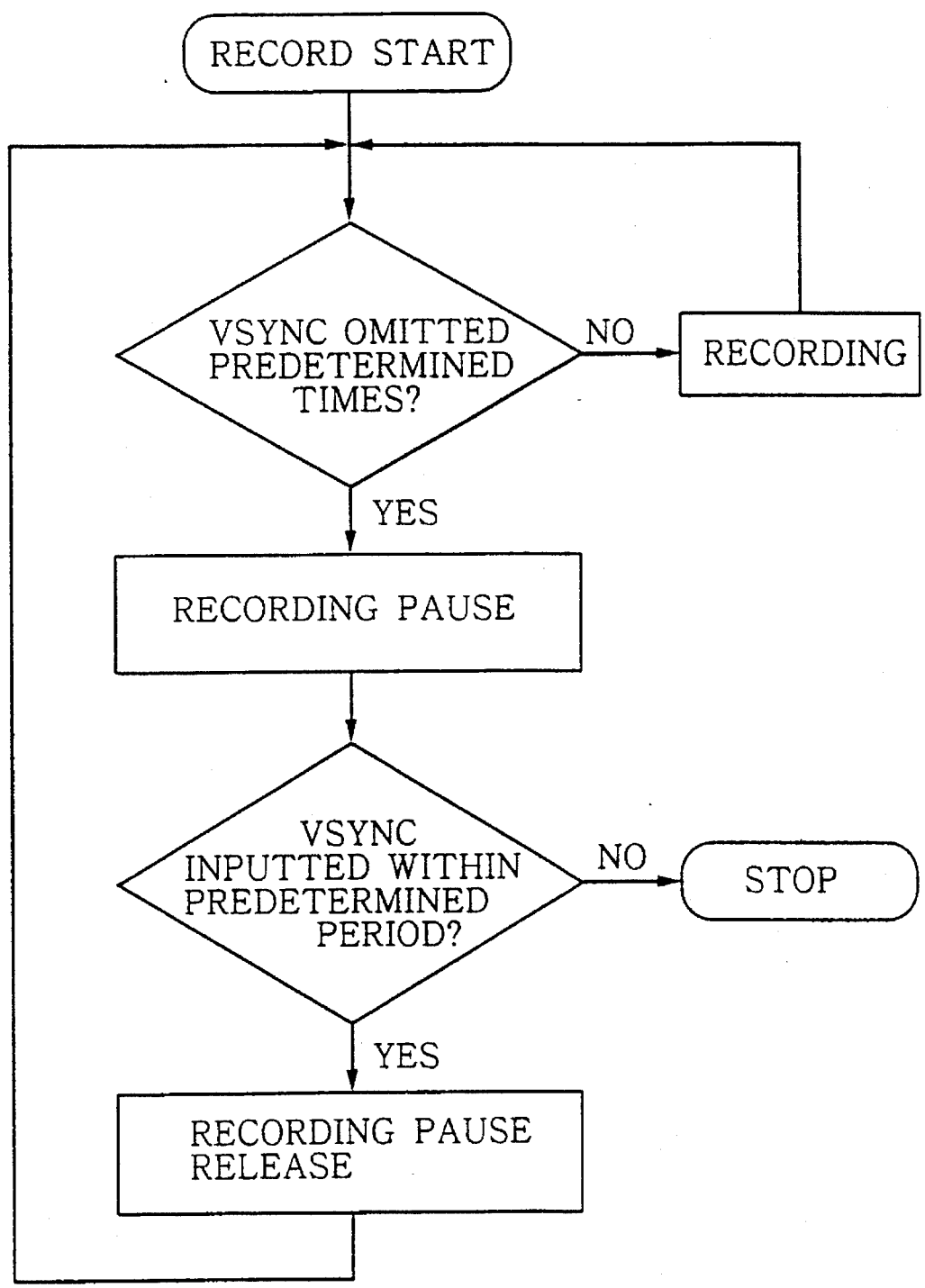
FIG. 4 is a flowchart illustrating a recording method for the VCR having the snow noise removing function in accordance with the present invention.

FIG. 4 is a flowchart illustrating a recording method for the VCR having the snow noise removing function in accordance with the present invention. First, it is checked whether the pulses of the vertical synchronous signal are omitted by the predetermined number in the recording of the TV broadcasting signal. If it is checked that the pulses of the vertical synchronous signal are not omitted by the predetermined number in the recording of the TV broadcasting signal, the recording operation is advanced because the TV broadcasting signal is normally received. On the contrary, in the case where the pulses of the vertical synchronous signal are omitted by the predetermined number in the recording of the TV broadcasting signal, it is determined that the reception of the TV broadcasting signal has been broken and the operating mode of the VCR is thus set to the recording pause mode. Then, it is checked whether the vertical synchronous signal is again received within the predetermined time period. If it is checked that the vertical synchronous signal is again received within the predetermined time period, the recording pause mode is released and the recording operation is again advanced. On the contrary, in the case where the vertical synchronous signal is not received again within the predetermined time period, it is determined that the reception of the TV broadcasting signal has completely been broken off and the operating mode of the VCR is set to the recording stop mode. As a result, the recording operation is stopped.

As apparent from the above description, according to the present invention, in the case where the reception of the TV broadcasting signal is broken off in the recording operation, a broken-off portion of the TV broadcasting signal is not recorded and only a normal portion thereof is selectively recorded. Therefore, the snow noise resulting from the reception broken-off state does not appear on a screen in a playback mode. Also, in the case where a recording time is set to any time after a broadcasting end time in a reserve-recording mode, a reserve-recording operation is not performed because of no broadcasting signal is received. Therefore, only a valid broadcasting program can be reserve-recorded.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A recording apparatus for a video cassette recorder having a snow noise removing function, comprising:

tuning means for tuning a television broadcasting signal received through an antenna to a channel desired by the user;

signal processing means for separating a vertical synchronous signal, a video signal and an audio signal from the television broadcasting signal tuned by said tuning means;

vertical synchronous signal counting means for counting the number of pulses of the vertical synchronous signal from said signal processing means;

system control means for discriminating a received state of the television broadcasting signal in response to the vertical synchronous signal from said signal processing means and a plurality of output signals from said vertical synchronous signal counting means and determining an operating mode of the video cassette recorder in accordance with the discriminated result; and servo control means for controlling a head drum and a capstan under control of said system control means to record the video and audio signals from said signal processing means on a magnetic tape.

2. A recording apparatus for a video cassette recorder having a snow noise removing function, as set forth in claim 1, wherein said vertical synchronous signal counting means includes:

a D flip-flop for inputting the vertical synchronous signal from said signal processing means at its reset terminal and outputting a reference signal from said system control means;

a first counter for inputting the vertical synchronous signal from said signal processing means at its reset terminal, counting the number of pulses of the reference signal from said D flip-flop and outputting an overflow signal to time counting means of said system control means upon generation of an overflow therein;

a first latch for latching an output signal from said first counter and outputting the latched signal as a recording pause signal to said system control means;

a transmission gate being enabled in response to the recording pause signal from said first latch to transmit the vertical synchronous signal from said signal processing means;

a second counter for counting the number of the pulses of the vertical synchronous signal transmitted from said transmission gate;

a second latch for inputting the recording pause signal from said first latch at its reset terminal, latching an output signal from said second counter and outputting the latched signal to a reset terminal of said first latch;

a third latch for latching an output signal from said time counting means; and a NOR gate for NORing an inverted one of an output signal from said third latch and an output signal from said second latch and outputting the resultant signal to said system control means.

3. A recording apparatus for a video cassette recorder having a snow noise removing function, as set forth in claim 2, wherein said system control means is adapted to set the operating mode of the video cassette recorder to a recording pause mode when the recording pause signal from said first latch is high in level, to set the operating mode of the video cassette recorder to a recording pause release mode to perform a recording operation again when the recording pause signal from said first latch is transited from its high level to its low level within a predetermined time period in said recording pause mode and to set the operating mode of the video cassette recorder to a recording stop mode to stop the recording operation if the recording pause signal from said first latch is not transited from its high level to its low level within the predetermined time period in said recording pause mode.

4. A recording apparatus for a video cassette recorder having a snow noise removing function, as set forth in claim 2, wherein said first counter is a binary counter.

5. A recording apparatus for a video cassette recorder having a snow noise removing function, as set forth in claim 2, wherein said second counter is a binary counter.

6. A recording method for a video cassette recorder having a snow noise moving function, comprising the steps of:

(a) judging whether pulses of a vertical synchronous signal are omitted by a predetermined number in recording of a television broadcasting signal, advancing a recording operation when it is judged that the pulses of the vertical synchronous signal are not omitted by the predetermined number in the recording of the television broadcasting signal and setting an operating mode of the video cassette recorder to a recording pause mode when it is judged that the pulses of the vertical synchronous signal are omitted by the predetermined number in the recording of the television broadcasting signal, wherein said recording pause mode is determined in accordance with a recording pause signal from a vertical synchronous signal counting means; and (b) judging whether the vertical synchronous signal is again received within a predetermined time period, releasing said recording pause mode to advance the recording operation again when it is judged that the vertical synchronous signal is again received within the predetermined time period and setting the operating mode of the video cassette recorder to a recording stop mode when it is judged that the vertical synchronous signal is not received again with the predetermined time period, wherein said recording stop mode is determined in accordance with a stop signal from said vertical synchronous signal counting means.

7. A recording apparatus for a video cassette recorder having a snow noise removing function, comprising:

tuning means for a television broadcasting signal received through an antenna to a channel desired by the user;

signal processing means for separating a vertical synchronous signal, a video signal and an audio signal from the television broadcasting signal tuned by said tuning means;

vertical synchronous signal counting means for counting the number of pulses of the vertical synchronous signal said signal processing means and of a reference signal, and for outputting a stop signal and a recording pause signal;

system control means for supplying the reference signal to said vertical synchronous signal counting means and for discriminating a received state of the television broadcasting signal in response to the vertical synchronous signal from said signal processing means and the stop signal and the recording pause signal from said vertical synchronous signal counting means and for determining an operating mode of the video cassette recorder in accordance with the discriminated result; and servo control means for controlling a head drum and a capstan under control of said system control means to record the video and audio signals from said signal processing means on a magnetic tape.

8. A recording apparatus for a video cassette recorder having a snow noise removing function, as set forth in claim 7, wherein said vertical synchronous signal counting means includes:

a D flip-flop for inputting the vertical synchronous signal from said signal processing means at its reset terminal and outputting a reference signal from said system control means;

a first counter for inputting the vertical synchronous signal from said signal processing means at its reset terminal, counting the number of pulses of the reference signal from said D flip-flop and outputting an overflow signal to time counting means of said system control means upon generation of an overflow therein;

a first latch for latching an output from said first counter and outputting the latched signal as a recording pause signal to said system control means;

a transmission gate being enabled in response to the recording pause signal from said latch to transmit the vertical synchronous signal from said signal processing means;

a second counter for counting the number of the pulses of the vertical synchronous signal transmitted from said transmission gate;

a second latch for inputting the recording pause signal from said first latch at its reset terminal, latching an output signal from said second counter and outputting the latched signal to a reset terminal of said first latch;

a third latch for latching an output signal from said time counting means; and a NOR gate for NORing an inverted one of an output signal from said third latch and an output signal from said second latch and outputting the resultant signal to said system control means.

9. A recording apparatus for a video cassette recorder having a snow noise removing function, as set forth in claim 8, wherein said system control means is adapted to set the operating mode of the video cassette recorder to a recording pause mode when the recording pause signal from said first latch is high in level, to set the operating mode of the video cassette recorder to a recording pause release mode to perform a recording operation again when the recording pause signal from said first latch is transited from its high level to its low level within predetermined time period in said recording pause mode and to set the operating mode of the video cassette recorder to a recording stop mode to stop the recording operation if the recording pause signal from said first latch is not transited from its high level to its low level within the predetermined time period in said recording pause mode.

10. A recording apparatus for a video cassette recorder having a snow noise removing function, as set forth in claim 8, wherein said first counter is a binary counter.

11. A recording apparatus for a video cassette recorder having a snow noise removing function, as set forth in claim 8, wherein said second counter is a binary counter.

* * * * *